April 5, 1960  D. R. KELLY  2,931,605
PIPE HANGER
Filed Jan. 6, 1958
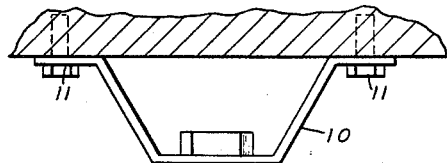
FIG.1
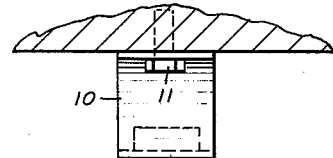
FIG.2
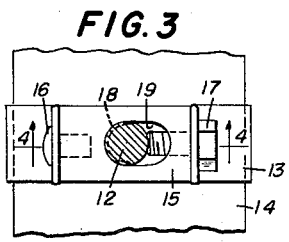
FIG.3
FIG.4
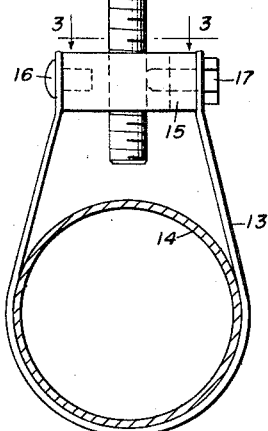
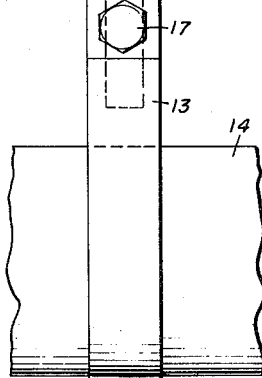
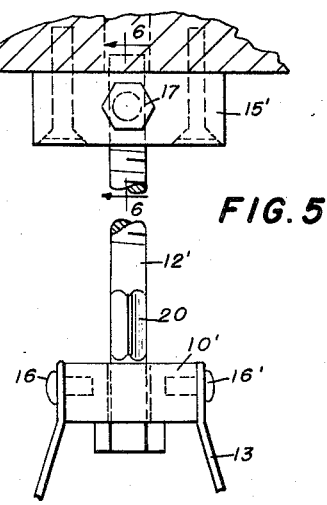
FIG.5
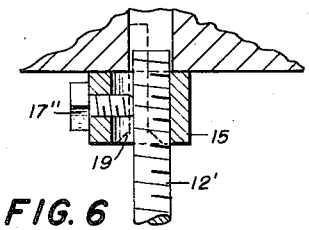
FIG.6
INVENTOR
DONALD R. KELLY
BY Frederick W. Turnbull
ATTORNEY

United States Patent Office 2,931,605
Patented Apr. 5, 1960

2,931,605

PIPE HANGER

Donald R. Kelly, Annville, Pa., assignor to Bokelco Manufacturing Company, New Bloomfield, Pa., a partnership Application January 6, 1958, Serial No. 707,350

5 Claims. (Cl. 248—59)

This invention relates to pipe hangers and more specifically to adjustable pipe hangers especially to pipe hangers for suspending pipes from the overhead and which include a threaded element by which the position of the pipe from the overhead may be readily adjusted.

Pipe hangers are known where a strap surrounding a pipe is supported by a bolt depending from a plate or bracket secured to the overhead. In assembling such devices and arriving at the final adjustment, so that the suspended pipe will be accurately placed, it is necessary to rotate the bolt with relation to a threaded nut element to run the support, in the first instance, to the approximate position so that the strap will be very nearly in the correct location. This is a quite time consuming operation especially in places where access is difficult. The final adjustment of the hanger, to be sure that the pipe is suspended at the precise height desired, and that the weight of the pipe is distributed between several pipe hangers equally, is made after the piping system is substantially complete.

It is an object of the present application to provide a pipe hanger in which it is not necessary to rotate the bolt or nut element to provide the initial adjustment of the hanger, yet the final adjustment may be made in the usual manner by rotation of a bolt element.

A further object of the invention is to provide such a pipe hanger that is reliable in use and inexpensive to manufacture.

Other and further objects and advantages of the device will appear in the following specification taken with the accompanying drawing in which like characters of reference designate similar parts in the several views and in which:

Fig. 1 is an end elevation of the device;
Fig. 2 is a side elevation of the device;
Fig. 3 is a section on line 3—3 of Fig. 1;
Fig. 4 is a section on line 4—4 of Fig. 3 of the nut element alone;
Fig. 5 is a fragmentary elevation similar to Fig. 1 showing a modification of the device; and
Fig. 6 is a section on line 6—6 of Fig. 5.

In the preferred embodiment of Figs. 1 and 2 there is provided a bracket element 10 secured to the overhead by any convenient securing means such as lag screws 11. This bracket may, of course, take any convenient form, and any alternative securing means that will securely support the device may be used.

A threaded bolt 12 is rotatably supported by bracket 11 in a depending position. A strap 13 is provided to encircle a pipe 14 which is to be supported.

The upper ends of strap 13 are secured to a nut element 15. The securement to one side of the nut element is shown as being rivet 16, and the securement to the other end is preferably a threaded element 17 which may act also as a set screw as will appear below. The rivet 16 may, of course, be replaced with any known securing means, but it is generally desirable that strap 13 be able to swing slightly on the nut element 15 so it can accommodate itself to irregularities in the pipe surface and to a slope in the pipe.

Nut element 15 is provided with a threaded bore 18 into which bolt 12 may be threaded. When the bolt is in bore 18 is will be seen that rotation of bolt 12 with respect to nut 15 will cause nut 15 to travel along or run on bolt 12 for adjustment of the position of strap 13.

A second bore 19, that is not threaded and which has a diameter equal to the outside diameter of the threads of bolt 12, is provided parallel to and overlapping bore 18. The axes of these two bores preferably lie in the plane of securing means 16, 17. The spacing between the axis of threaded bore 18 and unthreaded bore 19 is approximately such that the diameter of the clear opening of the threaded bore 18 forms a chord of the unthreaded bore 19.

It will be understood, then, from a study of Figs. 3 and 4, that if the bolt 12 is inserted in bore 19, with the threaded element 17 backed off so it does not intersect bore 19, then bolt 12 may pass freely through nut 15 so it may be moved to any desired location on bolt 12. When the nut 15 is located, as desired, along bolt 12 it may then be moved sideways to bring the axis of bore 18 of nut 15 into alignment with the axis of bolt 12. The threads of the nut and bolt then are in engagement and will operate as any nut and bolt.

In order to retain the bolt 12 in the threaded bore 18, threaded element 17 is rotated to bring its end 17' so far into bore 19 as to block bore 19 to preclude movement of the bolt 12 from engagement in threaded bore 18. Threaded element 17 may also be of sufficient length to act as a set screw to positively hold bolt 12 against rotation in threaded bore 18 to preclude any relative rotation that might change the adjustment. This is desirable when the hanger is used where there is vibration such as might occur on ships.

When nut 15 has been moved along bolt 12 to the approximate desired location and threaded element 17 is adjusted to retain the bolt in the threaded bore 18, the bolt 12 may be rotated to raise or lower the nut slightly on the bolt as required. It will, then, be clear to those skilled in the art that a great saving in time of installation of such hangers is accomplished as it is unnecessary to laboriously rotate the bolt to bring the nut to its approximate adjusted position, especially where the hanger is installed in a relatively inaccessible location.

The example shown in Figs. 5 and 6 is different from that described above in that the bolt 12' is rotatably secured to a cross piece 10' and a nut element 15' is secured to the overhead. Nut 15' is provided with overlapping bores 18 and 19 just as nut 15 is in Figs. 1 to 4, and a set screw 17" controls the interaction of bolt and nut as threaded element 17 does in Fig. 1 to 4 but does not, in this case, also serve to secure strap 13.

Flats 20 are shown on bolt 12' for use in rotating the bolt to achieve its final adjustment. Such flats may be provided on the bolt 12 of Figs. 1 and 2 if desired since application of a wrench to the bolt head is difficult and use of a wrench such as a "Stilson" wrench directly on the screw threads will permanently deface the threads.

In use, the brackets 10 with bolts 12 are secured to the overhead along the line of the axis of pipe 14, and the straps 13 mounted on nuts 15 are placed about pipe 14. As the pipes are put in place the nut 15 is slid up over bolt 12 by use of bore 19. When the nut is in approximately the correct position bolt 12 is moved over into bore 18 and threaded element 17 is rotated to advance it to block bore 19 to prevent bolt 12 from moving back to bore 19. After the pipe 14, and other pipes in the system, have been installed and it is desired to adjust the load of the pipes between hangers, each bolt 12 of the several hangers may be rotated to raise or lower its nut 15. As each nut 15 is adjusted bolt 17 may, if desired, be tightened to secure bolt 12 against rotation in nut 15.

It is to be understood that details of the construction shown may be altered or omitted without departing from the spirit of this invention as defined by the following claims.

I claim:

1. A pipe hanger comprising relatively rotatable screw threaded bolt and nut means, one of said means for securement to a support and the other for securement to a strap to receive a pipe, said nut being provided with a threaded bore to engage and run on the threads on said bolt, and an unthreaded cylindrical bore of a size to slidably receive said bolt, said threaded and unthreaded bores having their axes parallel and said bores overlapping to the extent that the bolt may move radially from the unthreaded bore into the threaded bore, and a blocking means operable in the plane of the axes of said bores to selectively permit sliding of said bolt means in said unthreaded bore, and to selectively hold said bolt from moving from said threaded to said unthreaded bore whereby said nut may be adjusted on said bolt by relative rotation therebetween.

2. A pipe hanger comprising bracket means adapted to be secured to a permanent support, strap means for surrounding and engaging a pipe to be supported, bolt and nut means for adjustably securing said strap means to said bracket means, said nut means being provided with a bore having a smooth interior surface of a size to freely slidably receive said bolt, and a threaded bore to engage the threads of said bolt, said bores being parallel and overlapping whereby the bolt may be moved radially between said bores, and blocking means that may be selectively introduced into said bore having a smooth interior surface, to prevent movement of said bolt radially from said threaded bore and withdrawn from said bore having a smooth interior surface whereby said bolt may be moved into said bore having a smooth interior surface for sliding adjustment of said nut on said bolt.

3. The pipe hanger of claim 2 in which said blocking means comprises a set screw.

4. The pipe hanger of claim 2 in which said bolt is rotatably mounted in said bracket and said strap means is secured to said nut.

5. The pipe hanger of claim 4 in which one end of said strap is secured to said nut by a bolt, said bolt also acting as said blocking means.

References Cited in the file of this patent
UNITED STATES PATENTS

| | | |
|---|---|---|
| 376,480 | Kenway | Jan. 17, 1888 |
| 831,326 | Dale | Sept. 18, 1906 |
| 1,698,571 | Van Cleve | Jan. 8, 1929 |
| 1,832,315 | McNulty | Nov. 17, 1931 |
| 2,631,357 | Gobel | Mar. 17, 1953 |